US006941143B2

United States Patent
Mathur

(10) Patent No.: US 6,941,143 B2
(45) Date of Patent: Sep. 6, 2005

(54) AUTOMATIC CHANNEL SELECTION IN A RADIO ACCESS NETWORK

(75) Inventor: Saurabh Mathur, Plainsboro, NJ (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 10/232,740

(22) Filed: Aug. 29, 2002

(65) Prior Publication Data

US 2004/0203808 A1 Oct. 14, 2004

(51) Int. Cl.$^7$ ................................................ H04Q 7/20
(52) U.S. Cl. ................... 455/452.1; 455/450; 455/455; 370/341
(58) Field of Search ........................ 455/452.1, 450, 455/451, 455, 454, 463, 464, 509, 515, 516; 370/329, 341, 319, 320, 344

(56) References Cited

U.S. PATENT DOCUMENTS

| | | | | |
|---|---|---|---|---|
| 4,332,027 A | * | 5/1982 | Malcolm et al. ............ 370/448 |
| 4,792,984 A | * | 12/1988 | Matsuo ...................... 340/7.42 |
| 4,870,408 A | * | 9/1989 | Zdunek et al. .............. 370/341 |
| 4,977,612 A | * | 12/1990 | Wilson .................... 455/166.1 |
| 5,276,730 A | * | 1/1994 | Cimini et al. ............ 455/452.1 |
| 5,287,400 A | * | 2/1994 | Saegusa ...................... 455/463 |
| 5,371,494 A | * | 12/1994 | Singh et al. ............. 340/825.5 |
| 5,463,659 A | * | 10/1995 | Nealon et al. .............. 375/133 |
| 5,485,147 A | * | 1/1996 | Jaffe et al. ................ 340/825.5 |
| 5,697,059 A | * | 12/1997 | Carney ....................... 455/509 |
| 6,175,739 B1 | * | 1/2001 | Ishii et al. ............... 455/452.1 |
| 2002/0060995 A1 | | 5/2002 | Cervello et al. ............ 370/332 |
| 2002/0188723 A1 | * | 12/2002 | Choi et al. .................. 709/225 |

FOREIGN PATENT DOCUMENTS

JP          407143549 A  *  6/1995

* cited by examiner

*Primary Examiner*—Charles N. Appiah
(74) *Attorney, Agent, or Firm*—Joseph S. Tripoli; Joseph J. Laks; Robert B. Levy

(57) ABSTRACT

Within a radio access network ($11_1$, $11_2$) an access point ($18_1$, $18_2$, $18_3$ and $18_4$) selects a channel by first randomly choosing a channel from those available for use. The Access Point then monitors the channel for a random interval to determine if the channel is presently carrying traffic. The Access Point will select the channel unless the channel is in use by another AP. If so, then the AP will select another channel and commence monitoring for a random interval in order to determine whether the channel is available. The AP will continue to choose channels until a suitable channel is found, or all available channels have been exhausted.

17 Claims, 2 Drawing Sheets

AUTOMATIC CHANNEL SELECTION IN A RADIO ACCESS NETWORK

TECHNICAL FIELD

This invention relates to a technique for automatically selecting channels in a Radio Access Network, such as a wireless Local Area Network (LAN).

BACKGROUND ART

Advances in the field of wireless LAN technology has led to the availability of relatively inexpensive wireless LAN equipment, which, in turn, has resulted in the emergence of publicly accessible wireless LANs (e.g., "hot spots") at rest stops, cafes, libraries and similar public facilities. Presently, wireless LANs offer users access to a private data network, such as a Corporate Intranet, or a public data network such as the Internet. The relatively low cost to implement and operate a wireless LAN, as well as the available high bandwidth (usually in excess of 10 Megabits/second) makes the wireless LAN an ideal access mechanism through which a mobile terminal user can exchange packets with an external source.

Within the wireless LAN, there exists one or more Access Points (APs) each typically comprising a transceiver for exchanging radio frequency signals with a mobile terminal user. Each AP communicates with the mobile terminal user on a particular channel. In most radio technologies, such as the radio technology embodied in the IEEE 802.11b standard, adjacent channels tend to overlap. For this reason, geographically adjacent APs within the wireless LAN try to assign non-overlapping channels to avoid interference. Often such channel assignments require manual intervention or specific protocol modifications. Unfortunately, this approach doesn't work well when geographically adjacent APs belong to wireless LANs operated by separate entities that lack the incentive to cooperate to reduce radio frequency interference.

Thus, there is need for a technique for automatically selecting channels in a wireless LAN to reduce interference without any modifications to the underlying communication protocol.

BRIEF SUMMARY OF THE INVENTION

Briefly, in accordance with present principles, a method is provided for selecting a radio channel by an access point (AP) within a radio access network. The method commences upon the AP initially choosing a channel randomly from among a plurality of available radio channels. The AP then monitors the selected channel for a random interval to determine if any traffic is present. If the channel is presently free (i.e., no use by another AP), then the AP claims the selected channel to carry traffic. Otherwise, if the channel already carries traffic, the AP chooses another channel. Thereafter, the AP monitors the newly selected channel during a random interval to determine the availability of the newly chosen channel. In practice, the AP repeats the process until it finds an available channel found, or it scans all the available channels.

DETAILED DESCRIPTION

Figure 1:
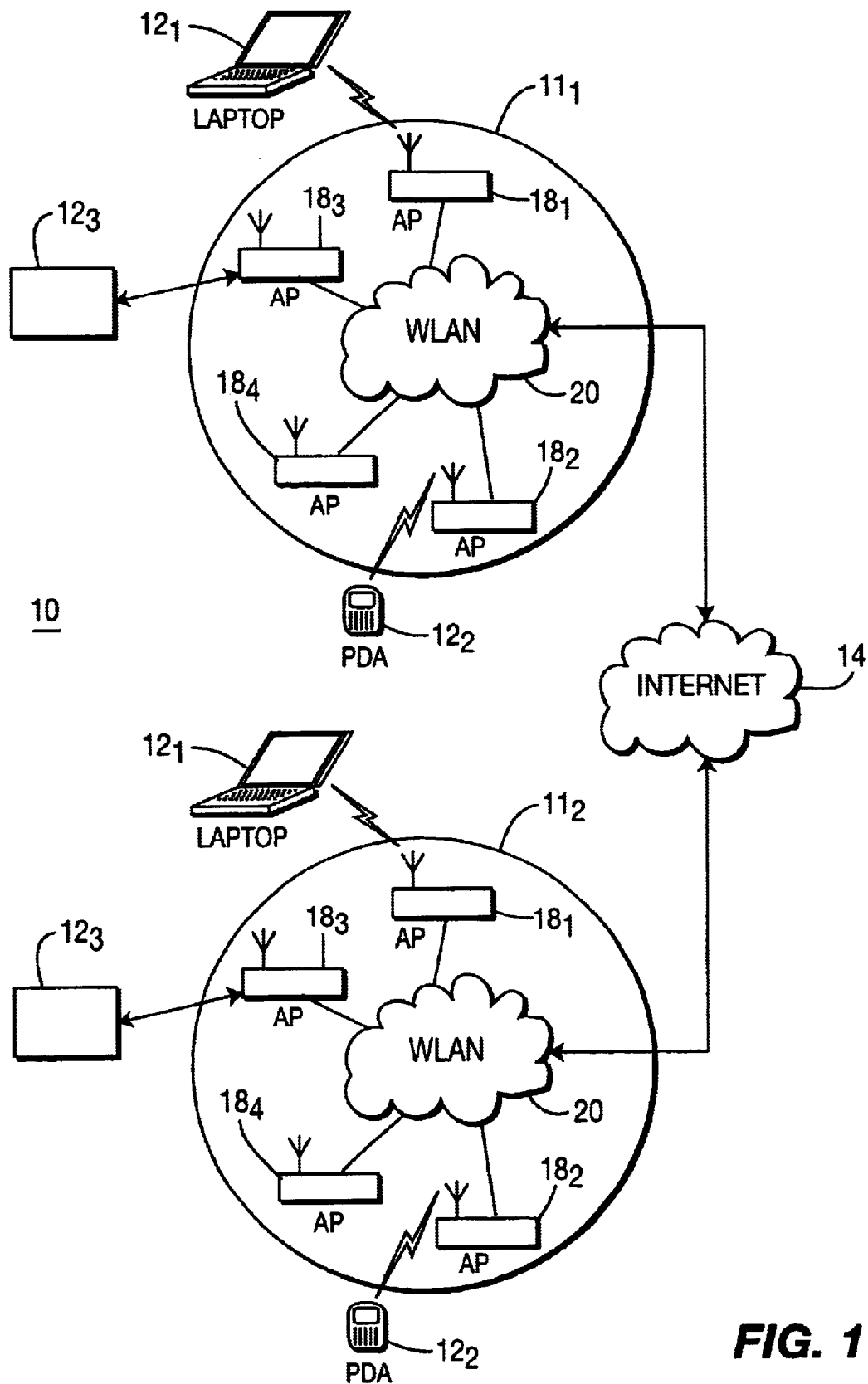
FIG. 1 depicts a block schematic diagram of a communication network that includes a plurality of radio access networks.

FIG. 1 depicts a block schematic diagram of a communications system 10 that includes at least one, and preferably, a plurality of radio access networks, illustratively depicted by radio access networks $11_1$ and $11_2$. The radio access networks $11_1$ and $11_2$ each enable at least one user, and preferably a plurality of users (e.g., users $12_1$, $12_2$, and $12_3$) to access an external data network 14 such as the Internet or the like. In a preferred embodiment, the user $12_1$ utilizes a lap top computer while the user $12_2$ utilizes a Personal Data Assistant and the user $12_3$ utilizes a wired communications appliance. Other users (not shown) could employ other types of wired or wireless communication appliances.

Each of the radio access networks $11_1$ and $11_2$ includes at least one, and preferably, a plurality of access points (APs), illustratively illustrated by APs $18_1$–$18_4$, via which each of the users $12_1$, $12_2$ and $12_3$ accesses a wireless Local Area Network (LAN) 20 within each access network. In the illustrated embodiment, each AP, such as AP $18_1$, includes a wireless transceiver (not shown) for exchanging radio frequency signals with a radio transceiver (not shown) within a communications appliance employed by a user, such one of users $12_1$ and $12_2$. One or more of the APs $18_1$–$18_4$ could also include a wired access mechanism by which a user, such as user $12_3$, can access the network via a wired communications appliance. Each of the APs $18_1$–$18_4$ in each of the radio access networks $11_1$ and $11_2$ employs one or more well-known wireless or wired data exchange protocols, such as the "HiperLan 2" or IEEE 802.11 protocol. Indeed, different APs can employ different wireless protocols to accommodate users whose communications appliances use different protocols.

Each of the access points $18_1$–$18_3$ communicates with a corresponding one of users $12_1$ and $12_2$ over a radio frequency link by choosing a particular radio channel over which to send and receive data. With most radio technologies, such as the IEEE 802.11b standard, adjacent channels exhibit some degree of overlap. Thus, radio interference will occur when geographically adjacent APs transmit on adjacent channels. In the past, the problem of adjacent channel interference has been overcome by manual intervention, or the adoption of specific protocol modifications to force the selection of non-adjacent channels. These approaches incur the disadvantage of requiring either full-time administrative control over geographically adjacent APs or requiring them to implement specific protocol modifications. Typically, the ability to exert control over adjacent APs does not exist when such adjacent APs belong to different network entities.

Figure 2:
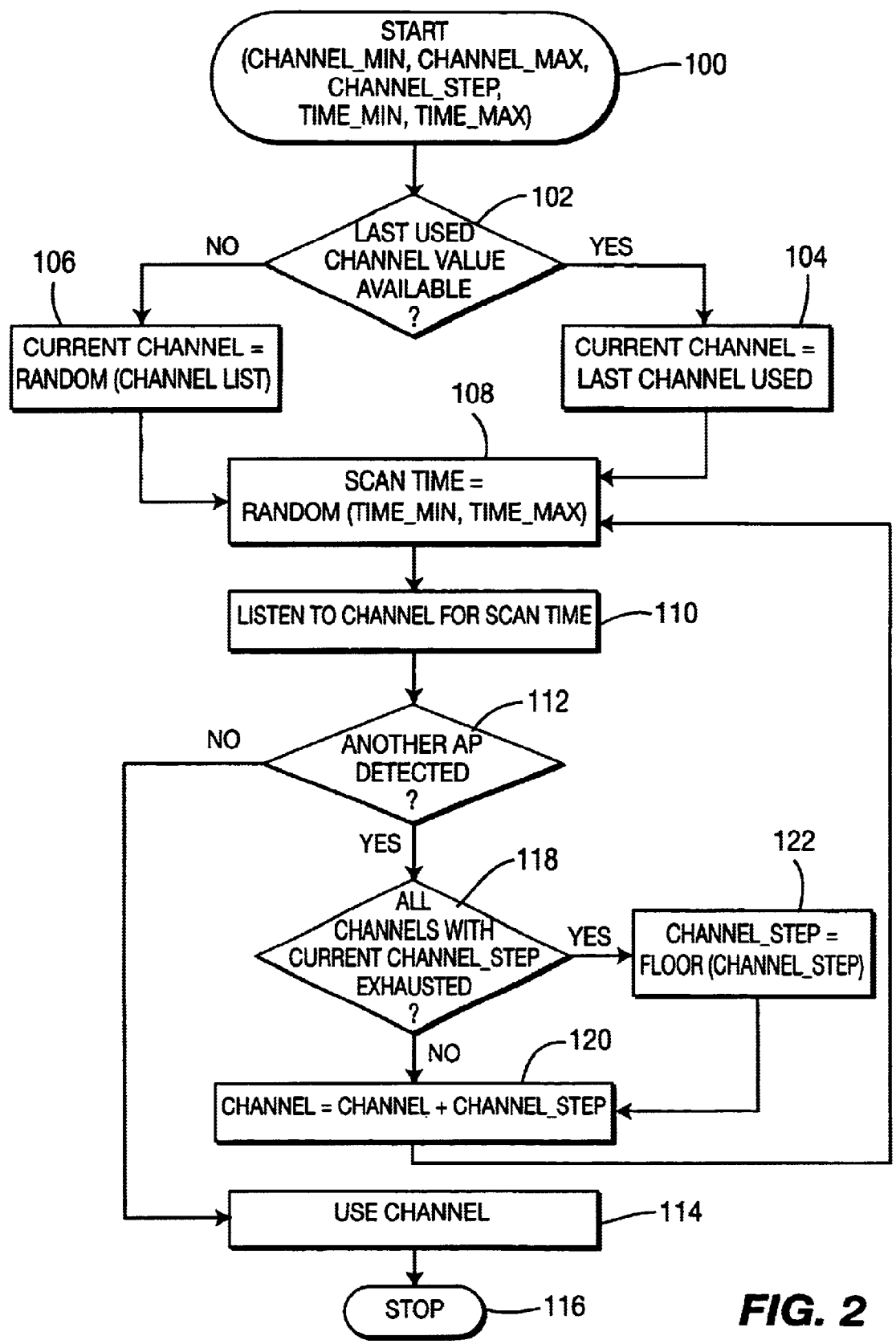
FIG. 2 depicts a flow chart illustrating the steps of the method of present principles for selecting a traffic-carrying channel within the communications system of FIG. 1.

FIG. 2 illustrates in flow chart form the steps of a method in accordance with the present principles for selecting a radio frequency channel for an AP, such one of the APs $18_1$–$18_4$ within one of the access networks $11_1$ and $11_2$. The channel selection method of FIG. 2 commences upon execution of step 100 during which the AP sets the following parameters:

| PARAMETER | DESCRIPTION |
| --- | --- |
| current_channel | The current channel selected by the AP |
| channel_min | The lowest channel number available |
| channel_max | The highest channel number available |
| channel_step | The separation between selected channels |

| PARAMETER | DESCRIPTION |
|---|---|
| time_min | The minimum time for channel monitoring |
| time_max | The maximum time for channel monitoring |

Following step 100, the AP makes a check during step 102 to determine whether the last channel used by the AP still remains available. If so, then AP selects the last channel used as the current channel during step 104. Checking the availability of the previously used channel increases efficiency. Often times, the AP can re-use the last channel before another AP claims the channel. Should the AP find the last channel unavailable, then the AP will select a channel at random from the available channel list during step 106.

Following either of steps 104 and 106, the AP executes step 108 during which the AP sets the channel-monitoring interval scan_time to a random value lying between time_min and time_max. Thereafter, the AP monitors the channel during step 110. The AP monitors the channel by listening during the interval scan_time for the presence of traffic (if any) carried by another access point (AP). During step 112, the AP checks whether the monitoring performed during step 110 uncovered use of the channel by another AP. Upon finding the channel free of traffic during step 112, the AP claims the channel for use during step 114 and the channel selection process ends (step 116).

If the AP finds the channel in use during step 112, the AP then makes a check during step 118 to determine whether other channels remain available for selection, taking into account the separation between selected channels prescribed by the current value of channel_step. Thus, for example, if the channel_step=2, then after selecting channel #1, the channel #3 becomes the next channel available for selection. Depending on the value of the current_channel and the number of channels available, the AP could find that additional channels still remain available. If so, the AP executes step 120 selects a next new channel in accordance with the relationship:

new channel=current_channel+channel_step before proceeding to re-execute step 108. Otherwise, upon detecting exhaustion of the available channels during step 118, the AP resets the value of current_channel during step 122 in accordance with the relationship:

channel_step=floor(channel_step/2)

In other words, during step 122, the AP resets the value of channel_step to the lowest integer value of one-half the previous value of channel_step. Thus, if the value of channel_step prior to step 122 was 3 for example, then following step 122, the new value would be one. After step 122, program execution branches to step 120.

To better understand the above-described channel selection method, consider the following three examples.

EXAMPLE 1

Assume that the APs $18_1$ and $18_2$ in the radio access network $11_1$ of FIG. 1 use channels #1 and #6, respectively, while AP $18_4$ remains off line. Further assume that AP $18_3$ just commenced operation and is the only AP implementing the channel selection method of the present principles. In implementing the channel selection method, assume that AP $18_3$ employs the following values: channel_min=1, channel_max=11, channel_step=5, time_min=500, and time_max=1000, with the time_min and time_max measured in milliseconds. Additionally, assume that AP $18_3$ did not store any information about the previously used channel.

In accordance with the channel selection method of the present principles, the AP $18_3$ will first select a current channel in accordance with the relationship current_channel=random(1, 6, 11)

For present purposes, assume that AP $18_3$ selected channel #6. Next, the AP $18_3$ selects the value for scan_time in accordance with the relationship:

scan_time=random(500, 1000)

For present purposes, assume that AP $18_3$ selected the value of scan_time as 600 milliseconds. Accordingly, the AP $18_3$ will listen to channel #6 for that interval. Since the AP $18_2$ is currently using channel #6 in this example, the AP $18_3$ will detect use of this channel. Therefore, the AP $18_3$ will select a new channel in accordance with the relationship:

new channel=current_channel+channel_step

In the present example, with current_channel=6 and channel_step=5, the AP $18_3$ will select channel #11. The AP $18_3$ now establishes a new value for the parameter scan_time, say 750 ms and then listens to channel #11 for that interval. Assuming that this channel carries no other traffic, the AP $18_3$ will now claim channel #11 for use.

EXAMPLE 2

Assume that the APs $18_1$, $18_2$, and $18_3$ within the radio access network $11_1$ use channels #1, #6, and #11, respectively. Further assume that AP $18_4$ in the same radio access network now commences operation and implements the channel selection method according to present principles. In implementing the channel selection method, assume that the AP $18_4$ selects the following parameter values: channel_min=1, channel_max=11, channel_step=5, time_min=500, time_min=1000. Additionally assume that AP $18_4$ did not store information about the previously used channel.

Using the channel selection method of the present principles, the AP $18_4$ will first select a channel in accordance with the relationship current_channel=random(1, 6, 11)

Assume that AP $18_4$ selects channel #6 as in the previous example. Next, the AP $18_4$ selects the value for the parameter scan_time in accordance with the relationship:

scan_time=random(500,1000)

Assume that AP $18_4$ selected a value of 660 milliseconds for scan_time so AP $18_4$ will listen to channel #6 for 660 ms for that interval. With channel #6 in use by AP $18_2$ in this example, the AP $18_4$ will find channel #6 occupied. Thus, the AP $18_4$ selects a new channel in accordance with the relationship:

new channel=current_channel+channel_step

In the current example, the AP $18_4$ will now select channel #11.

The AP $18_4$ next establishes a new value for scan_time, say 550 ms and then listens to channel #11 for that interval.

Since channel #11 remains in use by AP $18_3$ in this example, the AP $18_4$ will find channel #11 occupied as well.

Having found channel #11 busy, the AP $18_4$ selects another channel, and in this example, will now pick channel #1 due to wrap around. Having selected channel #1, the AP $18_4$ selects a new value for scan_time, say to 800 milliseconds and will listen to channel #1 for that interval. Since channel #1 remains in use by AP $18_1$ in this example, the AP $18_4$ will find channel #1 occupied as well.

All possible channels for selection have been exhausted in this example when channel_step=5. Therefore the AP $18_4$ will reduce the value of the parameter channel_step in accordance with the relationship:

channel_step=⌊channel_step/2⌋

In the current example, the new value of channel_step becomes 2. After reducing the value of channel_step to 2, the AP $18_4$ now selects another channel using the previously described relationship. In this example the AP $18_4$ now selects channel #3. Thereafter, the AP $18_4$ selects a new value for scan_time, say 730 milliseconds and now listens to channel 3 during that interval. Upon finding channel #3 free of traffic, the AP $18_4$ now claims this channel for use. Note that in this case, interference cannot be completely avoided because all interference-free channels are already in use.

EXAMPLE 3

This example describes scenario when two APs, such as APs $18_2$ and $18_3$ within the radio access network $11_1$, both startup simultaneously, while another AP, such as AP $18_1$ in the same network, currently uses channel #1. Assume that both APs $18_2$ and AP $18_3$ utilize the following parameter values: channel_min=1, channel_max=11, channel_step=5, time_min=500, time_min=1000. Also, assume that neither AP $18_2$ nor AP $18_3$ store information about the channel each previously used.

Using the method of the present principles, both of the APs $18_2$ and $18_3$ will each select a current channel as follows in accordance with the relationships:

For AP $18_2$ current_channel=random(1, 6, 11)

Assume AP $18_2$ has randomly selected channel #6.
For AP $18_3$ current_channel=random(1,6,11)

Also assume AP $18_3$ selects channel #6. If both AP $18_2$ and AP $18_3$ were to actually claim the same channel, severe interference would result. However, as will become apparent from the discussion hereinafter, the channel selection method of the present principles will prevent both of the APs $18_2$ and $18_3$ from claiming the same channel.

After each of the APs $18_2$ and $18_3$ initially selects a channel, each AP establishes a value for the parameter scan_time as follows:
For AP $18_2$ scan_time=random(500,1000) (say 660)

For AP $18_3$ scan_time=random(500,1000) (say 820)

Next, the AP $18_2$ listens to channel #6 for 660 ms while AP $18_3$ also listens to the same channel for 820 milliseconds.

Assuming that no traffic otherwise exists, then AP $18_2$ will find the channel free during the period it listened to and thus claim the channel for use. Since the parameter scan_time established by AP $18_3$ is longer than the parameter scan_time established by the AP $18_2$, the AP $18_3$ will listen longer and will ultimately detect use of channel #6 by the AP $18_2$ during the time interval between 660 and 820 ms.

Having found channel #6 occupied, the AP $18_3$ now must choose another channel and does so in the manner previously described. In the current example, assume AP $18_3$ selects channel #11. The AP $18_3$ now selects a new value for scan_time, say 530 milliseconds The AP $18_3$ now listens to newly selected channel #11 for 530 ms, and upon finding it free, now claims the channel for use.

The foregoing describes a technique for selecting a radio channel by an access point in a radio access network to minimize adjacent channel interference.

I claim:

1. A method for selecting a radio frequency channel from among a plurality of available channels for use by an access point in a radio access network, comprising the steps of:
    (a) randomly choosing a channel from the plurality of channels;
    (b) monitoring the chosen channel for a random interval to determine if the chosen channel is presently carrying traffic; and
    (c) claiming the channel for carrying traffic by the access point unless the chosen channel is presently carrying traffic.

2. The method according to claim 1 whereupon finding the chosen channel is presently carrying traffic, then performing the steps of:
    (d) choosing a different channel; and
    (e) repeating steps (b) and (c) for the different chosen channel.

3. The method according to claim 2 wherein the step of choosing the different channel comprises the step of choosing a new channel separated from the previously chosen channel by a preselected channel separation value.

4. The method according to claim 3 further including the steps:
    reducing the channel separation value if all available channels have been previously chosen; and
    choosing the new channel so as to be separated from the previously chosen channel by the reduced preselected channel separation value (step 120).

5. The method according to claim 1 wherein the step of monitoring the chosen channel comprises the steps of:
    selecting a prescribed minimum and a maximum channel monitoring intervals; and
    establishing the random interval between the prescribed minimum and maximum channel monitoring intervals.

6. The method according to claim 3 wherein the steps of (d) and (e) repeated until all available channels are monitored.

7. A method for selecting a radio frequency channel from among a plurality of available channels for use by an access point in a radio access network, comprising the steps of:
    (a) determining whether a last used channel is available for use and claiming that channel for use, but if the last used channel is not available, then
    (b) randomly choosing a channel from among the plurality of available channels;
    (c) monitoring the chosen channel for a random interval to determine if the chosen channel is presently carrying traffic; and (d) claiming the channel for carrying traffic by the access point unless the chosen channel is presently carrying traffic.

8. The method according to claim 7 whereupon finding the chosen channel is presently carrying traffic, then performing the steps of:

(e) choosing a different channel; and (f) repeating steps (c) and (d) for the different chosen channel.

9. The method according to claim 8 wherein the step of choosing the different channel comprises the step of choosing a new channel separated from the previously chosen channel by a preselected channel separation value.

10. The method according to claim 9 further including the steps:

reducing the channel separation value if all available channels have been previously chosen; and choosing the new channel so as to be separated from the previously chosen channel by the reduced preselected channel separation value.

11. The method according to claim 7 wherein the step of monitoring the chosen channel comprises the steps of:

selecting a prescribed minimum and a maximum channel monitoring intervals; and establishing the random interval between the prescribed minimum and maximum channel monitoring intervals.

12. The method according to claim 9 wherein the steps of (e) and (f) repeated until all available channels are monitored.

13. Apparatus for selecting a radio frequency channel from among a plurality of available channels for use by an access point in a radio access network, comprising the steps of:

(a) means for randomly choosing a channel from the plurality of channels;

(b) means for monitoring the chosen channel for a random interval to determine if the chosen channel is presently carrying traffic; and (c) means for claiming the channel for carrying traffic by the access point unless the chosen channel is presently carrying traffic.

14. The apparatus according to claim 13 wherein the channel claiming means chooses a different channel upon finding that the chosen channel is presently carrying traffic and wherein the monitoring means monitors the different channel for traffic.

15. The apparatus according to claim 14 wherein the channel claiming means chooses the different channel such that the different channel is separated from the previously chosen channel by a preselected channel separation value.

16. The apparatus according to claim 15 wherein the channel claiming means reduces the channel separation value upon exhausting all available channels for selection and thereafter chooses the different channel so as to be separated from the previously chosen channel by the reduced preselected channel separation value.

17. The apparatus according to claim 13 wherein the channel monitoring means monitors the chosen channel by selecting a prescribed minimum and a maximum channel monitoring intervals; and then establishing the random interval between the prescribed minimum and maximum channel monitoring intervals.

* * * * *